United States Patent
Morreale et al.

(10) Patent No.: US 11,124,287 B2
(45) Date of Patent: Sep. 21, 2021

(54) FAN MODULE WITH VARIABLE-PITCH BLADES FOR A TURBOMACHINE

(71) Applicant: SAFRAN AIRCRAFT ENGINES, Paris (FR)

(72) Inventors: Serge Rene Morreale, Guignes (FR); Yanis Benslama, Paris (FR); Jeremy Dievart, Paris (FR); Dominik Igel, Hericy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 555 days.

(21) Appl. No.: 16/068,088

(22) PCT Filed: Dec. 22, 2016

(86) PCT No.: PCT/FR2016/053646
§ 371 (c)(1),
(2) Date: Jul. 3, 2018

(87) PCT Pub. No.: WO2017/118793
PCT Pub. Date: Jul. 13, 2017

(65) Prior Publication Data
US 2020/0369369 A1 Nov. 26, 2020

(30) Foreign Application Priority Data
Jan. 5, 2016 (FR) ...................................... 1650021

(51) Int. Cl.
*B64C 11/32* (2006.01)
*F01D 7/00* (2006.01)
(Continued)

(52) U.S. Cl.
CPC .............. *B64C 11/325* (2013.01); *F01D 7/00* (2013.01); *B64C 11/385* (2013.01); *F02K 3/06* (2013.01);
(Continued)

(58) Field of Classification Search
CPC ....... F01D 7/00; B64C 11/325; B64C 11/385; B64C 11/32; B64C 11/38; F05D 2220/36;
(Continued)

(56) References Cited

U.S. PATENT DOCUMENTS 3,873,236 A * 3/1975 Gall .......................... F01D 7/00
416/162
4,037,986 A 7/1977 Chilman
(Continued)

FOREIGN PATENT DOCUMENTS

FR 1207013 A 2/1960
FR 2957986 A1 9/2011
(Continued)

OTHER PUBLICATIONS

International Search Report and Written Opinion received for PCT Patent Application No. PCT/FR2016/053646, dated Apr. 6, 2017, 14 pages (6 pages of English Translation and 8 pages of Original Document).

*Primary Examiner* — Woody A Lee, Jr.
*Assistant Examiner* — Eric A Lange
(74) *Attorney, Agent, or Firm* — Womble Bond Dickinson (US) LLP

(57) ABSTRACT

The invention relates to a fan module with variable-pitch blades for a turbomachine, comprising a rotor (2) carrying blades (3), a stationary housing (7), a mechanism (11, 12, 13, 14, 20) for regulating the pitch of the blades (3), which is connected to the rotor, and a control means (16, 17) mounted on the stationary housing (7) and comprising a control part (18) that can be moved in translation according to an axis (X) of rotation of the rotor (2), and a bearing (19) for load transfer between the control part (18) and said mechanism, characterised in that it also comprises a stationary track (23) supporting the elastic restoring means (26, 27) which are arranged so as to exert an axial restoring force on the control
(Continued)

part (18) towards a determined position, preferably corresponding to the blade (3) feathering.

13 Claims, 4 Drawing Sheets

(51) Int. Cl.
*B64C 11/38* (2006.01)
*F02K 3/06* (2006.01)

(52) U.S. Cl.
CPC ...... *F05D 2220/36* (2013.01); *F05D 2260/38* (2013.01); *F05D 2260/50* (2013.01); *F05D 2260/79* (2013.01); *F05D 2270/64* (2013.01)

(58) Field of Classification Search
CPC ............. F05D 2260/38; F05D 2260/50; F05D 2260/79; F05D 2270/64; F05D 2240/50; F05D 2250/41; F02K 3/06; F02K 3/04; Y02T 50/60
See application file for complete search history.

(56) References Cited

U.S. PATENT DOCUMENTS

| | | | | |
|---|---|---|---|---|
| 4,743,163 | A * | 5/1988 | Markunas | ................. F01D 7/02 |
| | | | | 416/44 |
| 2014/0205457 | A1* | 7/2014 | Curlier | ................. F04D 29/323 |
| | | | | 416/160 |
| 2014/0294585 | A1* | 10/2014 | Escure | .................... F02K 3/072 |
| | | | | 416/147 |
| 2017/0066522 | A1* | 3/2017 | Curnock | ............... F04D 29/362 |

FOREIGN PATENT DOCUMENTS

| | | | | |
|---|---|---|---|---|
| FR | 2980770 A1 | 4/2013 | | |
| FR | 3009710 B1 | 4/2017 | | |
| GB | 773065 A | * 4/1957 | ........... B64C 11/385 |

* cited by examiner

FAN MODULE WITH VARIABLE-PITCH BLADES FOR A TURBOMACHINE

FIELD OF THE INVENTION

The invention relates to a turbomachine fan with variable-pitch blades. More specifically, it relates to a mechanism for regulating the pitch of the blades.

PRIOR ART

The variable pitch of a turbomachine fan is a way of boosting performance in various flight conditions. The variable pitch may equally be advantageous in placing the blades in a feathered position, i.e. where they do not exert any thrust on the air even as the fan rotates, and then in a position where the thrust of the fan is reversed, without changing its rotation direction. The feathered position is a middle position of the blade pitch angle between the propulsion and the reverse thrust modes.

To give a variable pitch to the blades, one can use the solution described in the patents FR-B1-3009710 or FR-B1-29800770, for instance. In this case, the blades are pivotally mounted on a support ring of the fan's rotor. A system of rods can control the rotation of the fans by acting on pairs of conical pivots or on link rods, for instance. The movement of the rods can be driven by a hydraulic cylinder.

Pursuant to aviation regulations, variable-pitch blades are automatically placed in the feathered position in case the hydraulic control fails, regardless of the speed at which the failure occurs, be it in thrust position or in reverse thrust position.

To comply with this requirement, currently known systems make use of eccentric counterweight centrifugal force. For instance, the solution proposed in the patent FR-B1-3009710 places its counterweights or fly-weights at the level of the connection point between the blades and the support ring. A fly-weight is connected to each blade by a gearing system arranged such that in case of a failure in the variable-pitch control, the fly-weight driven by the centrifugal force is swiftly placed in a position that forces the corresponding blade into feathered position.

This system nevertheless presents the inconvenient to increase the system mass with, more particularly, some dynamic effects, as it is about mass rotating with the fan.

The aim of the invention is to propose an alternative to such variable-pitch regulation systems for the blades of a fan, with a view to reducing the overall mass, especially the rotating masses.

PRESENTATION OF THE INVENTION

The invention relates to a fan module with variable-pitch blades for a turbomachine, comprising a rotor carrying blades, a stationary housing, a mechanism for adjusting the pitch of the blades, and a control means mounted in the stationary housing and comprising a linearly moveable control part according to a rotation axis of the rotor, and a bearing for load transfer between the control part and the said mechanism, characterised by the fact that it comprises a stationary track supporting the elastic return means, arranged in a manner to exert an axial return force on the control part towards a given position, which corresponds preferably to the blade feathering position.

According to currently known means, the arrangement of the blade pitch adjustment mechanism helps to transform an axial translation movement of a part in the moving frame of the rotor into a rotation of the blades around their pitch axis. The load transfer bearing helps to link up the axial translations of the control part in the stationary frame of the turbomachine with those of the said part of the adjustment mechanism on the rotor. Since the elastic return means exert their force in between two non-rotating parts, they themselves remain static, thereby limiting the rotating mass. Additionally, since they do not employ inertial effects, their return force is not directly proportionate to their mass.

Preferably, the said given position is a middle position of the control part, and the axial return means are arranged in a manner to exert the said return force in the two directions around the middle position.

Preferably, the axial return means have at least two springs, each of them arranged to exert an axial return force in a given direction relative to the middle position.

By so doing, the springs exert their efforts in both directions and may, therefore, be designed to obtain an optimised return output that is suitable for both modes of operation of the fan, namely propulsion and reverse thrust modes.

Advantageously, each spring is arranged such that when it exerts its return force, it is placed in compression in between an axial stop linked to the control part blocking a first axial end of the spring, and another part supporting the return means locking a second axial end of the spring.

Advantageously, the supporting fixed part of the return means comprises at least an axial stop arranged to lock the first axial end of each spring, where the control part is axially located after the middle position relative to the return direction of the spring.

Advantageously, the control part slides around the fixed track.

By so doing, this part of the blade pitch adjustment and control system can have a smaller radial overall dimension and can fit inside a blade support ring.

Advantageously, the rotor is secured on the housing by at least a first bearing fitted between the rotor shaft and a fixed part of the housing, while the fixed track is attached to the fixed part carrying the said first bearing.

With this configuration, the blade adjustment and control mechanism, and the control means can be housed in an annular space between the support ring and the rotor shaft, where these are located in front of the first bearing and a transmission reducer located between the engine of the turbomachine and the rotor of the fan.

In the document, the terms "in front" and "behind", specifying the positions of the parts in relation to each other, refer to the normal travel direction of the turbomachine when operated in the air.

Advantageously, the control means comprises an actuator, which is generally an actuating cylinder, for the moveable part, including a housing mounted on the same fixed part as the said first bearing.

With this configuration that is most suitable for the rotor of a fan located in front of the turbomachine, the overall dimension of the adjustment mechanism can be reduced with the actuator or cylinder located inside the rotor.

Preferably, the rotor comprises a shaft that extends radially beneath the fixed track.

With this configuration that is most suitable for the rotor of a fan located in front of the turbomachine, a free space can be obtained and used in between a blade support ring and the rotor shaft in front of the stationary housing holding the rotor.

In this case, one or more matching bearings for securing the shaft can be distributed lengthwise on the axial extension of the fixed part.

This will help to better secure the rotor in connection with the cylinder components, and hence to reduce the clearance in the frame passage bearings of the means connecting the control part to the link rods. As a result, the link rods may feature a much larger radius around the axis of the rotor and their leverage can be increased. This will either help to increase the number of blades or lower the dimensional requirements for the cylinder for the same number of blades. This will also help to eliminate the additional bearings for securing the rotor on the stationary housing, and hence to save on mass.

In another version of embodiment, a second bearing for securing the rotor is mounted between a radially outer surface of the control means housing and a part of the blade support ring.

The rigid structure provided by the control means housing therefore makes it possible to secure the rotor around the shaft with a second bearing, which has a larger diameter than the first bearing. The larger diameter helps to stiffen the assembly, thereby preventing the production of resonance modes at low speeds, while eliminating the mass of support parts for bearings located further away, such as those used in the prior art.

BRIEF DESCRIPTION OF THE DRAWINGS

This invention will be better understood and other details, specifications and advantages of same will come out more clearly after reading the following description with reference to the appended drawings, on which.

DESCRIPTION OF AN EMBODIMENT OF THE INVENTION

Figure 1:
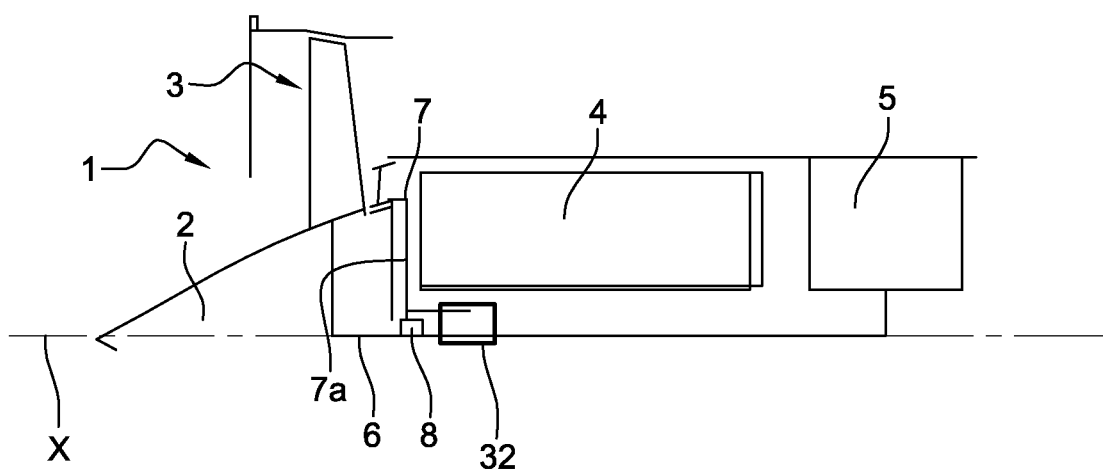
FIG. 1 is a schematic diagram of a turbomachine using the invention.

For instance, the invention relates to a turbomachine like the one schematically illustrated on FIG. 1. It has a fan 1 comprising a rotor 2 that carries a series of blades 3. The fan 1 is generally streamlined. Here, the fan 1 is placed in front of the engine section of the turbomachine, which comprises a gas generator 4 and a power turbine 5 that drives the shaft 6 of the rotor 2 of the fan. Here, the fan 1 rotates around an X axis, which is also the rotation axis of the engine section components and is generally located in front of the stationary housing 7 enclosing the engine section. The shaft 6 of the rotor runs across the stationary housing 7 and is axially secured through the latter by a bearing 8. The shaft 6 is also rotationally driven by a shaft connected to the power turbine (not illustrated) through a reducer 32.

The rotor 2 is located in front of a stationary housing 7 of the turbomachine. Preferably, the bearing 8 is arranged to secure the shaft 6 both radially and axially. For this reason, preference is given to ball bearings. Here, the bearing 8 is also mounted on a supporting part 7a of the housing 7 near the reducer 32.

Figure 2:
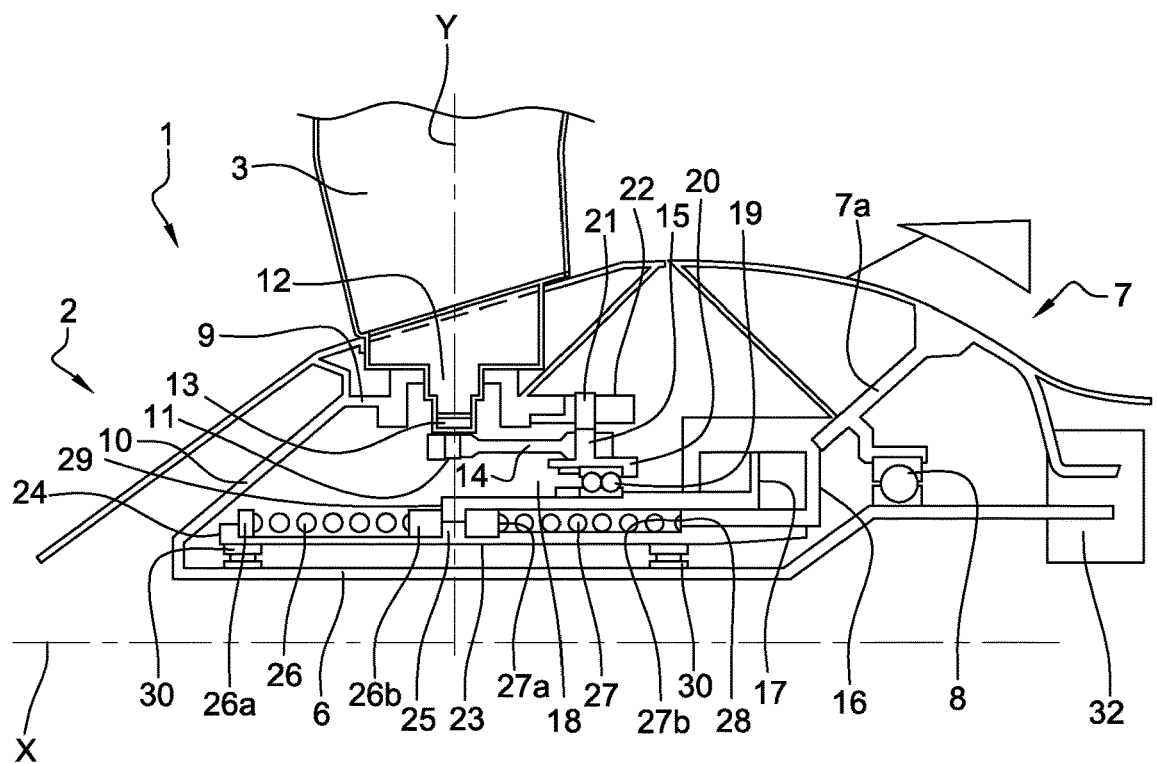
FIG. 2 is a schematic axial cross-section view of a first embodiment of a rotor blade pitch adjustment system according to the invention, with blades placed in a feathered position.

According to a first embodiment with reference to FIG. 2 in this configuration, the rotor 2 also comprises a support ring 9 for the blades 3 located in front of the bearing 8. The front of the support ring 9 is linked to the front of the rotor 2 by a substantially truncated part, and the assembly is configured such that there is a free interior space in front of the bearing 8, between the support ring 9 and the shaft 6.

As illustrated on FIG. 2, a blade 3 is moveably mounted on the support ring 9 rotating around a substantially radial Y axis by means of an anti-friction bearing, for instance (not illustrated). The blade 3 comprises a shaft 12 centred on the Y axis, which projects radially beyond the support ring 9 in the free interior space.

Figure 3:
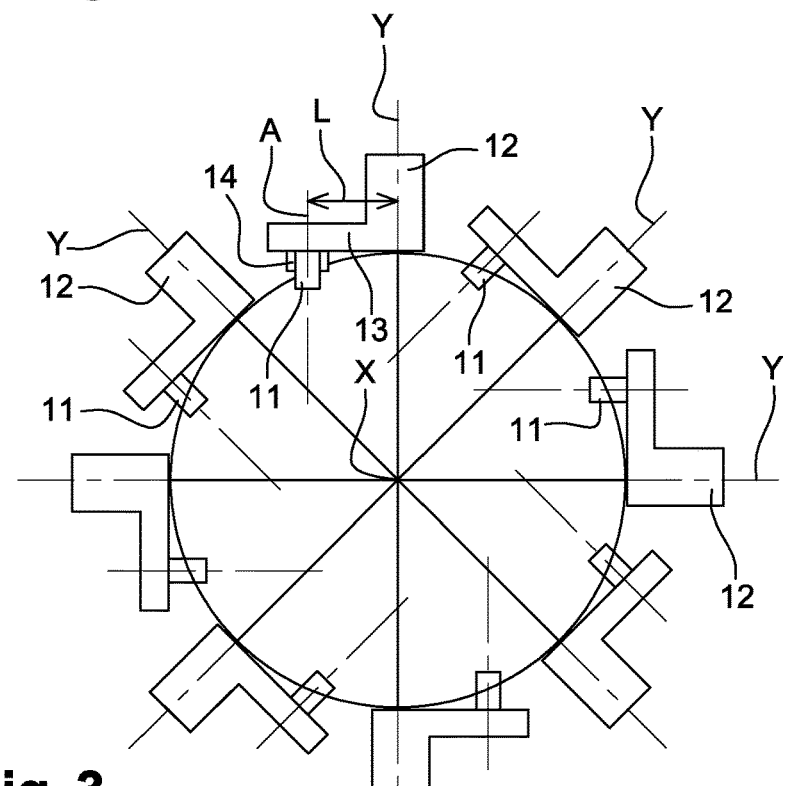
FIG. 3 is a schematic front view of the blade pitch angle control rods for a system according to the invention.

With reference to FIGS. 2 and 3, a crank 13 secured to the pivot shaft 12 of the blade 3 is arranged in a manner substantially perpendicular to the blade, in a plane transverse to the X axis of the rotor 2. A substantially axial connecting rod 14 is also pivotally mounted on a pin 11 on point A of the crank 13, in a direction substantially parallel to the Y axis of the pivot shaft 12. The end of the pivot shaft 12, the crank 13 and the pin 11 may be combined in a single piece to form a blade rotating arm.

By so doing, an axial translation of the link rod 14 exerts a leverage of a length L equal to the distance between the connection point A and the Y axis of the pivot shaft 12, thereby causing the blade to rotate around the Y axis. The example on FIG. 3 illustrates eight shafts 12 for the fan blades evenly distributed on the circumference. The crank 13 may extend in the space separating the two respective pivot shafts 12 to produce the leverage L.

Here, the link rod 14 also extends backwards, and comprises on its rear end a head with an opening in which a pin 15 is inserted to push it forward or pull it backwards. Depending on the axial position of the pin 15, the angle of each blade 3 may therefore vary around a mean position representing the feathered position, to end up either in a thrust position or a reverse thrust position.

The system is completed by an axial cylinder used to axially move the pins 15 passing through the heads of the link rods 14. The axial cylinder comprises a casing 16 attached to the stationary housing 7 and placed in the free interior space of the rotor 2. The casing 16 creates a chamber in which a piston 17 can move, driving an annular part 18 that extends axially in front of the casing 16. Advantageously, the casing 16 and the piston 17 are equally annular around the X axis of the rotor 2. The position of the piston 17 is obtained by an oil pressure difference on either side of the piston 17 inside the chamber of the casing 16, which is controlled by a control circuit not illustrated on the Figure. As in the prior art described previously, the control circuit is known to have servo means used to regulate the oil pressure entering the cylinder in order to obtain a specific movement of the piston 17. However, it should be noted that unlike this prior art, there is no need to introduce a dynamic seal into the oil system since the casing 16 of the cylinder is secured on the housing 7.

The annular part 18 driven by the piston 17 also carries the inner track of a load transfer bearing 19, thereby allowing a ring 20 connected to the fan rotor 2 to rotate around the said part 18. The outer track of the bearing 19 is secured on the said ring 20, while the inner track is attached to the annular part 18. By so doing, the axial movement of the annular part 18 axially drives the ring 20, while allowing it to rotate with the rotor 2.

The ring 20 equally supports the pins 15 arranged to fit into the heads of the link rods 14, thereby enabling them to move axially. In this manner, the movement of the piston 17 of the cylinder is transferred to the link rods 14, thereby causing each blade 3 to rotate around its Y pitch axis.

Preferably, the ring 20 also has at least a stem 21 that protrudes radially into an axial slide guide 22 connected to the ring 9 supporting the blades 3. This helps to set the azimuthal position of the ring 20 relative to the rotor 2, by sharing the circumferential stress between the rotor 2 and the ring 20 without interfering with the displacement mechanism of the link rods 14.

A fixed and substantially tubular annular track 23 around which the moveable annular part 18 slides is also attached to the inner radial periphery of the casing 16, and extends axially forward along the shaft 6 of the rotor. The axial forward extension of this fixed annular track 23 is longer than that of the moveable annular part 18 driven by the piston. Preferably, the fixed annular track 23 runs across the Y pitch axis of the blades 3, and extends substantially up to the connection point between the shaft 6 and the truncated part 10 without touching them.

The fixed annular track 23 also comprises a first flange 24 projecting radially from its outer periphery to its front end, and a second flange 25 also projecting radially from its outer periphery, substantially midway between the front radial wall 28 of the chamber 16 and the first flange. A first helical spring 26 is mounted around the outer periphery of the fixed annular track 23. This spring is arranged between the first flange 24 and the second flange 25. It has stops at both ends 26a, 26b, which help to hold it between the flanges 24, 25. A second helical spring 27 is mounted around the outer periphery of the fixed annular rack 23, in between the second flange 25 and the front wall 28 of the casing 16 of the cylinder, thereby forming an axial stop on the fixed annular track 23. The second spring 27 also has a stop 27a on its front end, the rear stop 27b being formed by the front wall 28 of the casing 16. The second spring is radially located between the fixed annular track 23 and the moveable annular part 18.

As to the moveable annular part 18 driven by the piston 17, it is designed to slide axially between the said springs 26, 27 without touching them. However, on its front end, the annular part 18 has a flange 29 that projects radially inwards, such that it pushes axially on the stop of the rear end 26b of the first spring 26 and the stop of the front end 27a of the second spring 27. On FIG. 2, the moveable annular part 18 lies in a middle position, where its end flange 29 fits in between the rear stop 26b of the first spring 26 and the front stop 27a of the second spring 27 above the second flange 25 of the fixed annular part 18. In order to avoid flapping of the blades during feathering in case the cylinder fails, the flanges 25 and 29 must have the same thickness and machining allowances that are similar to one another A radial overlap is obtained between the feathering system and the blade pitch movement transformation system, while space is created to increase the cylinder's diameter if necessary. Moreover, on the bearings 30 used to secure the rotor on the shaft 6 in the annular track 23, the small anti-friction bearings, i.e. with a lower radius than the bearing 8, help to create a smaller space. The space available for the cylinder is optimised by placing the bearings 30 and the system controlling the blade pitch movement transformation and the return to a feathered position on top of one another.

It should be noted that if a static cylinder is used, especially a non-hydraulic one, to actuate the axial movement of a moveable annular part 18 for a blade 3 pitch adjustment system that is similar to the one described previously, and that one is not necessarily bound by an obligation to install a return system, one can still use this configuration to mount a fixed annular track 23 to support the bearings. Depending on the actuator system used, the fixed annular track 23 may be attached to a casing containing the actuator, and secured on a structural part 7a that holds the first bearing 8, or be composed of the casing itself if it extends sufficiently in front of the first bearing 8.

One can equally notice that the heads of the link rods 14 are located behind the shaft 12 of the blades 3. Their length is such that when the moveable annular part 18 is in the middle position described earlier, with its front stop 29 substantially facing the second stop 25 of the fixed annular track 23, the ring 20 is in a position close to the casing 16 of the cylinder while allowing it to move backwards. This middle position of the ring 20 helps to ensure the stiffness of the assembly.

Moreover, in the example on FIG. 3, the fixed annular track 23 is connected to the shaft 6 of the rotor by one or more central matching bearings 30 arranged lengthwise. The rotor 2 comprising the shaft 6, the conical connecting piece 10 and the support ring 9 form a pin of sorts that fits into the annular track 23 and encloses the stator composed of the fixed actuator. The substantially tubular shape of the annular track 23 helps to stiffen it.

The pin formed by the rotor 2 is secured inwards along the shaft 6 by the bearing 8 near the reducer 32 and by central bearings 30 along the annular track 23. This arrangement enhances the transverse retention of the rotor 2 by distributing the efforts lengthwise on the fixed annular track 23, from the first central bearing 30 arranged on the housing at the level of the hydraulic cylinder chamber right up to the second central bearing 30 located, on the example, just next to the front of the pin of rotor 2.

Here, it should be noted that unlike the first bearing 8, the central bearings 30 do not need to provide an axial support, and offer the advantage of having smaller anti-friction bearings. They may be formed by roller bearings, which prevent an axial overstress on the rotor 2.

With the central bearings 30 holding the rotor, the outer bearings holding the rotor can be fitted through the stationary housing 7 on the periphery of the bearing 8. This configuration helps to minimise the structural mass, especially the structural rotating mass of the rotor that holds it in place.

By securing the rotor 2 on its shaft 6, space is freed up outside the ring 9. By so doing, a larger radius can be given to the blade support ring 9. Additionally, by stiffening the connection between the cylinder and the rotor 2 through the central bearings 30, this helps to limit the play in the bearing 19 transferring load to the control ring 20 of the link rods 14.

Stiffening the assembly and providing space to increase the diameter of the support ring 9 helps to space out the link rods 14 on the X axis of the rotor 2. As illustrated on FIG. 3, the available distance between two pivot shafts 12 for a given angular spacing is proportionate to the radius at which the link rods 14 appear at the base of the pivot shaft 12. It is thus possible to either increase the number of blades 3 on the fan 1 or, with a constant number of blades 3, to increase the leverage L, thereby lowering the sizing requirements of the hydraulic cylinder and its control circuit.

Figure 4:
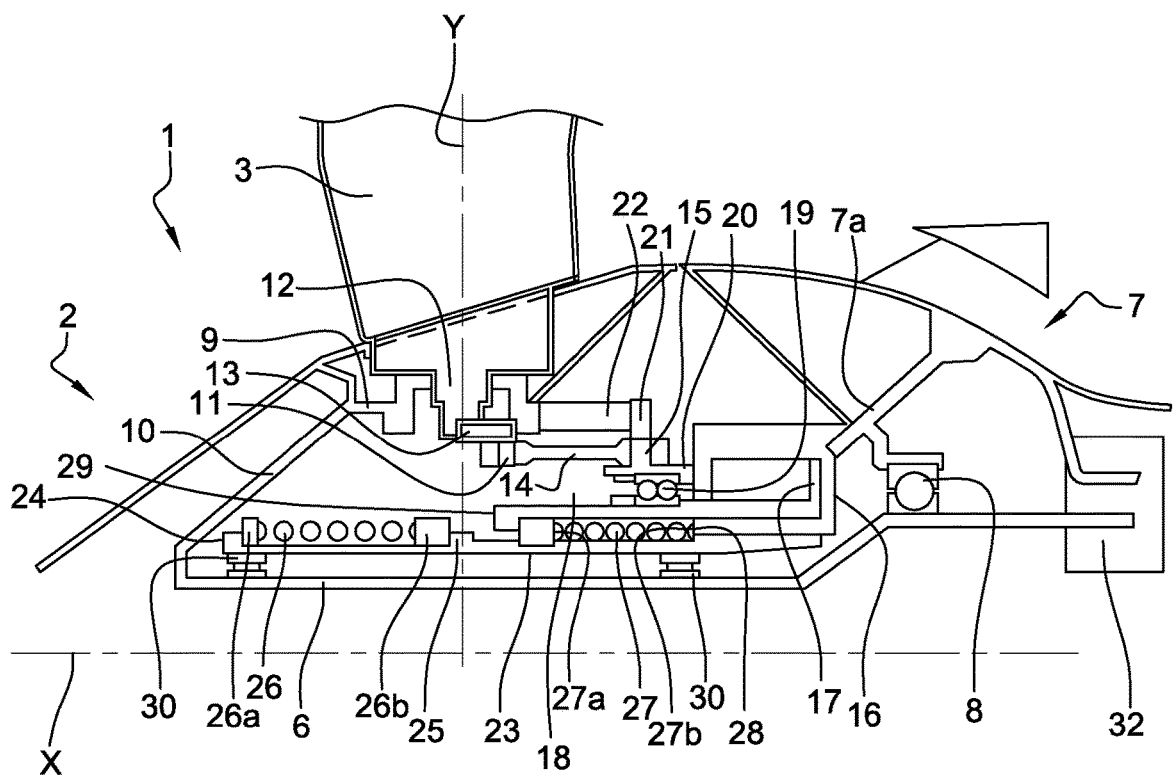
FIG. 4 is a schematic axial cross-section view of the first embodiment representing FIG. 3 with blades in propelling position.

The blade 3 pitch adjustment system thus described operates in the following manner:

With reference to FIG. 4, when the cylinder piston 17 moves backwards, it causes the blades 3 to rotate such that their pitch is in propulsion mode. The front stop 29 of the moveable annular part 18 compresses the second spring 27 against the stop formed by the front wall of the casing 16, while the first spring 26 remains trapped in between the first flange 24 and the second flange 25 of the fixed annular track 23, without interacting with the moveable annular part 18. In case of a failure in the hydraulic control system and the cylinder happens to break down, the return force exerted by the second spring 27 pushes the moveable annular part 18 forward up to the middle position shown on FIG. 3, where its front flange 29 faces the second flange 25 of the fixed annular track 23, with both springs 26 and 27 having their ends 26b and 27a abutting against the said second flange 25. The middle position of the moveable annular part 18 having been designed to fit with the blade 3 angle in feathering position, the system performs its safety role when the fan 1 is in propulsion mode.

Figure 5:
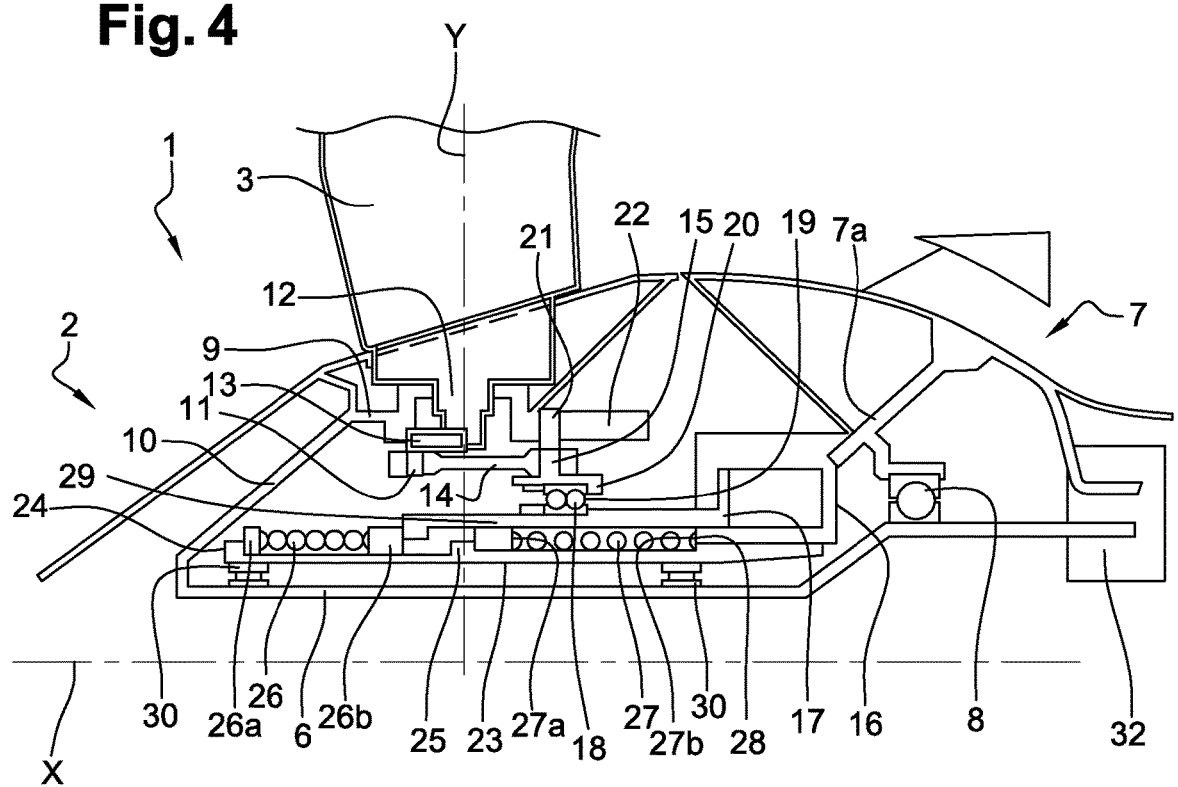
FIG. 5 is a schematic axial cross-section view of the first embodiment representing FIG. 3 with blades in reverse thrust position.

Symmetrically, with reference to FIG. 5, when the cylinder piston 17 moves forward, it causes the blades 3 to rotate such that their pitch is in reverse thrust mode. Moreover, the front stop 29 of the moveable annular part 18 compresses the first spring 26 against the first stop 24 of the fixed annular track 23, while the second spring 27 remains trapped in between the second flange 25 of the fixed annular track and the front transverse wall of the casing 16, without interacting with the moveable annular part 18. In case of a failure in the hydraulic control system and the cylinder happens to break down, the return force exerted by the first spring 26 pushes the moveable annular part 18 backwards to the middle position shown on FIG. 3, where its front flange 29 faces the second flange 25 of the fixed annular race 23, with both springs 26 and 27 having their ends 26b and 27a abutting against the said second flange 25. By so doing, the system also performs its safety role when the fan 1 is in reverse thrust mode.

It should be noted that in both situations, the springs 26 and 27 normally return the moveable part 18 to a single and constant neutral position, namely the feathering position.

Meanwhile, the springs 26 and 27 acts independently of one another according to the operation mode. The two springs can therefore be designed differently to optimise their return forces and tailor the blade 3 feathering movements to the propulsion mode on the one hand, and the reverse thrust mode on the other hand. More especially, they must be more robust than the aerodynamic stresses exerted on the fan blades 3.

Figure 6:
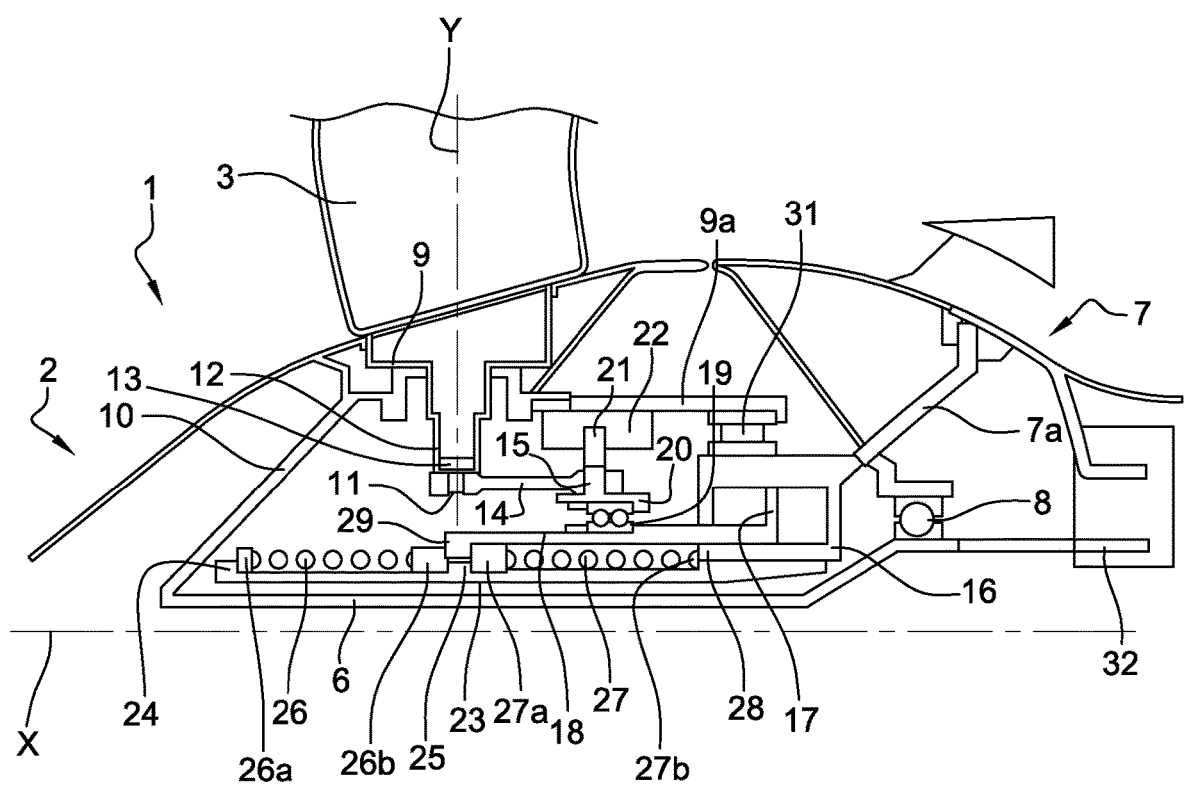
FIG. 6 is a schematic axial cross-section view of a second embodiment of a rotor blade pitch adjustment system according to the invention, with blades placed in a feathered position.

In a second embodiment, with reference to FIG. 6, the cylinder casing 16 is used, wherein the casing is secured in front of the first retention bearing 8 of the rotor 2 on the part 7a of the stationary housing 7. Preferably, the casing 16 has an annular shape, especially its outer radial wall. A rear race 9b of the blade support ring 9b is arranged such that it is connected to the outer radial wall of the hydraulic cylinder casing 16 by a bearing 31 that enables it to rotate around the said wall.

The bearing 31 is mounted inversely relative to the bearing 8: the rotor 2 supports the outer race of the bearing 31, while it supports the inner race of the bearing 8 on the shaft 6.

Here, the rotor 2 comprising the shaft 6, the conical connecting piece 10 and the support ring 9 together with the rear race 9a, forms a pin of sorts that fits into the annular rack 23 and encloses the stator composed of the fixed actuator up to the cylinder chamber 16, on the part 7a.

In this configuration, the rotor 2 is thus fully connected at its rear end to the stationary housing 7, by two inverted bearings connected to the same fixed structural part 7a. As previously indicated, the axial locking function being performed by the first bearing 8 on the shaft 6, the second bearing 31, with its larger diameter, secures the transverse rotation of the rotor 2. Preferably, it is therefore composed of roller bearings to avoid creating any axial overstress.

With this solution, the fan 1 is held by a bearing 31 with a larger diameter than in the second embodiment, thereby allowing for more stiffness. The latter point helps to avoid undermining the fan's smooth operation by eliminating resonance modes in low-speed vibrations.

This embodiment offers an alternative to the first embodiment that secures the rotor 2 in a stiff position. Moreover, by using the cylinder casing 16 to support a second retention bearing 31 for the rotor 2, the structural body 7a of the housing 7 already in place is capitalised to secure the first bearing 8. In the process, the mass of the system is equally minimised and the stiffness achieved allows for the diameter of the rotor 2 to be increased.

Furthermore, in another version of the invention (not illustrated), it is possible to secure the fan rotor using one or more bearings connecting a flange that extends axially towards the rear of the support ring 9 to a part of the stationary housing 7. By so doing, the fan 1 may rotate with respect to the housing 7 with no need for the bearings described in the previous embodiments, in tandem with the variable-pitch and feathering system. The fan is secured transversely and axially by the bearing 8 on the shaft of the rotor 6, and the other bearings that are more spaced out with respect to the X rotation axis.

The invention claimed is:

1. Fan module with variable-pitch blades for a turbomachine, including a rotor carrying blades, a stationary housing, a system for adjusting the pitch of the blades connected to the rotor by means of a control which is mounted on the stationary housing and which comprises a control part that is moveable in translation along a rotation axis (X) of the rotor, and a load transfer bearing between the control part and the said system, wherein the fan module includes a fixed track that supports elastic return means arranged to exert an axial return force on the control part, pushing it to a given position
wherein the control part slides around the fixed track.

2. The module according to claim 1, wherein the given position is a middle position of the control part in which the elastic return means are arranged to exert the return force in both directions around the middle position.

3. The module according to claim 1, wherein the elastic return means comprise at least a first spring and a second springs, each of said first spring and second spring is arranged to exert an axial return force in a given direction relative to the middle position.

4. The module according to claim 3, wherein each said spring is arranged such that when said spring exerts its return force, it is placed in compression between a first axial stop connected to the control part locking a first axial end of the spring, and a second axial stop connected to the fixed track supporting the elastic return means locking a second axial end of the spring.

5. The module according to claim 4, wherein the fixed track supporting the elastic return means comprises at least an axial stop (25) arranged to lock the first axial end of each spring, where the control part is axially located after the middle position relative to the return direction of the spring.

6. The module according to claim 3, wherein said control part is slidable axially between the first spring and the second spring.

7. The module according to claim 1, wherein the control part slides around the fixed track.

8. The module according to claim 1, wherein the rotor is secured on the housing by at least a first bearing arranged between a shaft of the rotor and a fixed part of the housing, in which the fixed track is secured on the fixed part carrying said fixed bearing.

9. The module according to claim 1, wherein the control part has an actuator, including a casing mounted on the fixed part.

10. The module according to claim 7, wherein a second bearing retaining the rotor is mounted in between an outer radial wall of the casing of the control part and a part of a ring supporting the blades.

11. The module according to claim 1, wherein one or several matching bearings retaining the shaft of the rotor are displayed on the axial extension of the fixed track.

12. The module according to claim 1, wherein the given position corresponds to the feathering of the blades.

13. Fan module with variable-pitch blades for a turbomachine, including a rotor carrying blades, a stationary housing, a system for adjusting the pitch of the blades connected to the rotor by means of a control which is mounted on the stationary housing and which comprises a control part that is moveable in translation along a rotation axis (X) of the rotor, and a load transfer bearing between the control part and said system, wherein the fan module has a fixed track that supports elastic return means arranged in a manner to exert an axial return force on the control part, pushing it to a given position;
  wherein the elastic return means comprise at least a first spring and a second spring, and each of said first spring and second spring is arranged to exert an axial return force in a given direction relative to the middle position;
  said control part being slidable axially between the said first spring and the second spring.

* * * * *